(12) United States Patent
Bung et al.

(10) Patent No.: US 10,302,229 B1
(45) Date of Patent: May 28, 2019

(54) ADJUSTABLE SUCTION PIPE ASSEMBLY WITH IMPROVED PRESSURE ACTIVATED SEAL

(71) Applicant: Great Plains Industries, Inc., Wichita, KS (US)

(72) Inventors: Hubert J. Bung, Wichita, KS (US); Donnie L. Baker, Wichita, KS (US); Robert W. Calvert, Wichita, KS (US)

(73) Assignee: Great Plains Industries, Inc., Wichita, KS (US)

( * ) Notice: Subject to any disclaimer, the term of this patent is extended or adjusted under 35 U.S.C. 154(b) by 782 days.

(21) Appl. No.: 14/943,488

(22) Filed: Nov. 17, 2015

(51) Int. Cl.
| | | |
|---|---|---|
| *F16L 21/03* | (2006.01) | |
| *F16L 21/08* | (2006.01) | |
| *F16L 17/025* | (2006.01) | |

(52) U.S. Cl.
CPC ............. *F16L 21/03* (2013.01); *F16L 17/025* (2013.01); *F16L 21/08* (2013.01)

(58) Field of Classification Search
CPC . F16L 21/03; F16L 21/08; F16L 17/02; F16L 17/025; F16L 17/032; F16J 15/022; F16J 15/025
USPC ........ 285/110, 345, 374, 910, 918; 277/616, 277/626
See application file for complete search history.

(56) References Cited

U.S. PATENT DOCUMENTS

| | | | | |
|---|---|---|---|---|
| 2,882,073 A | * | 4/1959 | James | F16L 17/025 285/110 X |
| 3,858,912 A | * | 1/1975 | Bower | 277/626 X |
| 4,182,519 A | * | 1/1980 | Wilson | F16L 21/03 277/616 |
| 4,299,412 A | * | 11/1981 | Parnnann | F16L 17/032 285/110 |
| 4,576,403 A | * | 3/1986 | Burkholder | 285/374 X |
| 5,653,452 A | * | 8/1997 | Jarvenkyla | 285/345 X |
| 6,193,238 B1 | * | 2/2001 | Sporre | 277/616 X |

* cited by examiner

*Primary Examiner* — Greg Binda
*Assistant Examiner* — Zachary T Dragicevich
(74) *Attorney, Agent, or Firm* — Husch Blackwell LLP

(57) ABSTRACT

An adjustable suction pipe assembly for use in a liquid transfer system including at least first and second pipe members wherein one end of the second pipe member includes a seal member and wherein the second pipe member is frictionally insertable within the first pipe member, the seal member being slidably adjustable along the length of the first pipe member. The seal member is oriented such that a portion thereof extends away from the outside diameter of the second pipe member and sits in a space formed between the engagement of the first and second pipe members. If the fluid level within the supply tank is below the location of the seal member, atmospheric air which may enter the first pipe member at a location above the seal member will force the seal member against the inside diameter of the first pipe member thereby further sealing the connection therebetween.

8 Claims, 4 Drawing Sheets

ADJUSTABLE SUCTION PIPE ASSEMBLY WITH IMPROVED PRESSURE ACTIVATED SEAL

BACKGROUND OF INVENTION

The present invention relates generally to a suction pipe for use in a liquid transfer system and, more particularly, to an adjustable suction pipe incorporating an improved pressure activated seal to prevent air from being drawn into the pump inlet and adversely effecting pump performance.

A suction pipe is typically used in a liquid transfer system to convey the liquid from the supply tank to a pump inlet for dispensing the liquid inside the supply tank. To accommodate various depths of supply tanks, a suction pipe is typically comprised of various sections and can be made adjustable with a sliding joint between at least two section members. Typically, a suction pipe would include a bottom or first section, a middle or second section, and an extension or third section. A seal is typically located between the bottom section and the middle section to prevent air from being drawn into the pipe and thereafter into the pump inlet which is attached to the suction pipe exterior of the supply tank. If the fluid level within the supply tank is above the seal joint, the joint has no impact on pump performance. However, if the fluid level in the supply tank is below the seal joint, the joint must incorporate a seal sufficient to prevent air from being drawn into the suction pipe and then into the pump inlet which can adversely affect pump performance. If an extension section is utilized, the extension section is typically threaded onto one end portion of the middle section in such a manner that a seal between the members forming this connection juncture is not necessary. Since the middle section is adjustable and collapsible within the bottom pipe section, an appropriate seal between the joinder of these two suction pipe sections is necessary to prevent air and/or fluid from inadvertently entering the suction pipe and adversely effecting pump performance.

FIGS. 1 and 2 illustrate examples of prior art seal devices associated with adjustable suction pipes known in the industry. The seal 10 is made up of multiple components including an O-ring 12, a rubber U-cap member 14, and a body member 16. The seal is energized with the O-ring 12 and the overall seal 10 is fabricated using a spin-weld operation. This operation includes spinning adjacent components relative to each other at a rotation speed sufficient to frictionally fuse the relative components together. While the seal 10 is effective, the multiple component design and use of a spin-weld operation increases the manufacturing cost and complexity of the seal and joinder of the seal to the suction pipe.

The seal 20 illustrated in FIG. 2 discloses another known plastic seal which includes seal edges 22. While seal 20 is relatively simple and easy to install, as the pump inlet pressure decreases, the seal edges 22 tend to pull away from the interior surface of the suction pipe thereby allowing air to be drawn into the suction pipe through the joint established between suction pipe members 24 and 26 starting at the joinder point indicated by arrow 28. Air is drawn into suction pipe member 25 because once the pump is activated, as will be hereinafter further explained, the pressure inside the suction pipe will be lower than atmospheric pressure and if the joint/seal arrangement 20 is above the fluid level within the supply tank, atmospheric pressure air can be sucked into pipe member 24 as previously explained. This can cause cavitation in the pump and will adversely affect pump performance.

Although the known suction pipe seals are effective under most operating conditions, there is a need for an improved seal arrangement which will more positively avoid atmospheric air from being drawn into the suction pipe when the fluid level within the supply tank is below the location of the seal thereby avoiding adverse pump performance as well as cavitation, and thereby improving the overall performance of the suction pipe and the pump. As a result, the present invention is directed to overcoming one or more of the problems set forth above and represents an improvement over the known prior art seal arrangements associated with adjustable suction pipes.

SUMMARY OF INVENTION

The present invention overcomes many of the shortcomings and limitations of the known prior art seal devices and teaches the construction and operation of an adjustable suction pipe assembly utilizing a pressure activated seal to prevent air from being drawn into the pump inlet during certain operations. The present adjustable suction pipe assembly may include a bottom or first pipe section for resting on the bottom of the supply tank, the bottom pipe section including a plurality of slots or openings for improving fluid flow from the supply tank into the suction pipe; a middle or second pipe section incorporating the present seal member; and, if necessary, an extension or third pipe section for cooperatively engaging one end portion of the middle pipe section depending upon the height of the supply tank.

The present seal member snaps onto one end portion of the middle pipe section and is frictionally engaged with the bottom pipe section. The middle pipe section is slidable within the bottom pipe section and is frictionally held in place at any intermediate location therebetween by the configuration of the present seal. The present seal edges have been inverted such that if the fluid level in the supply tank is below the seal level, any pressure reduction in the pump inlet will allow atmospheric pressure in the supply tank, if it leaks in at all, to further push the seal edges outwardly against the inner surface of the suction pipe thereby further engaging the seal with the suction pipe and preventing any air from being drawn into the pump inlet. A shoulder is also located in the vicinity of one end portion of the bottom pipe section and serves as a stop mechanism for preventing the middle pipe section from being disengaged from the bottom pipe section.

Because engagement of the present seal with the inner surface of the bottom pipe section is inverted, that is, a portion of the seal is angled outwardly or oriented away from the middle pipe section so as to sit within a space formed between the middle and bottom pipe sections, the negative pressure or vacuum created by the pump when fluid is being suctioned out of the supply tank causes atmospheric air, if it enters the joint/seal area between the bottom and middle pipe sections, to actually further engage and force the present seal member against the inner wall surface of the bottom pipe section thereby further sealing the joint area and actually activating the present seal. This design substantially eliminates any air from being drawn into the pump inlet thereby preventing adverse pump performance.

If necessary, an extension pipe member can also be engaged with the opposite end portion of the middle pipe section to further extend the suction pipe, if necessary depending upon the overall size or length of the supply tank. The extension pipe section is engaged with the middle pipe section in a conventional manner using a threaded engagement between the respective pipe sections. In addition, molded ribs associated with one end portion of the extension pipe section and located on the outside surface thereof opposite the internal threads provide reinforcement for the pipe end portion as well as tightening and loosening means for engaging the pipe extension section with the middle pipe section.

These and other aspects and advantages of the present adjustable suction pipe assembly and improved pressure activated seal will become apparent to those skilled in the art after considering the following detailed description in connection with the accompanying drawings.

BRIEF DESCRIPTION OF DRAWINGS

For a better understanding of the present invention, reference may be made to the following drawings.

DETAILED DESCRIPTION

Figure 3:
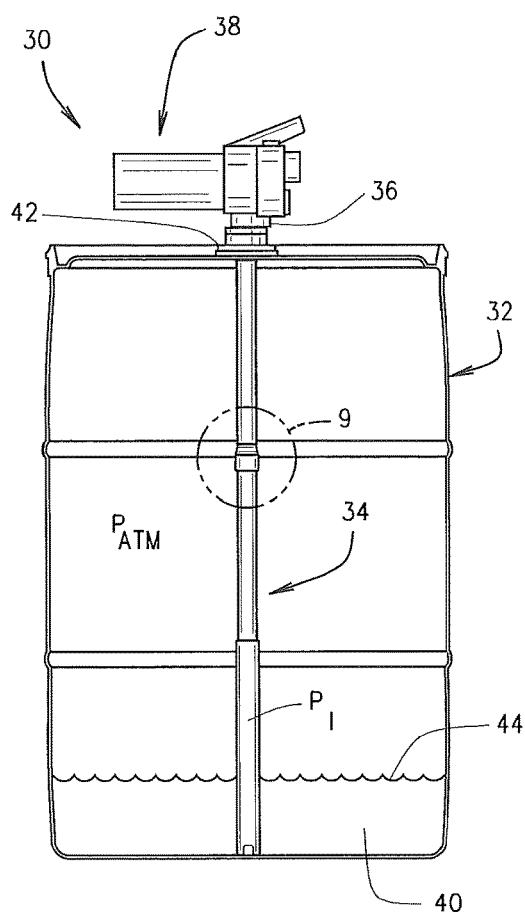
FIG. 3 is a side elevational view illustrating the present adjustable suction pipe assembly in operative position within a typical supply tank and having a conventional pump attached thereto for transferring liquid from the supply tank to the pump inlet for dispensing therefrom.

Referring to the drawings more particularly by reference numbers wherein like numerals refer to like parts, the number 30 in FIG. 3 identifies a typical supply tank 32 having one embodiment of the present adjustable suction pipe assembly 34 installed therewithin and connected to the pump inlet 36 of a typical transfer pump 38 for transferring the liquid 40 in the supply tank to the pump inlet 36 for dispensing the liquid 40 for a particular use or application. The present adjustable suction pipe assembly 34 and its connection to pump 38 identifies a typical liquid transfer system for use in conjunction with a wide variety of different supply tanks. The outside diameter of the present suction pipe assembly is configured and constructed so as to be compatible for insertion into the bung hole 42 associated with a typical tank such as supply tank 32 illustrated in FIG. 3. Reference number 44 in FIG. 3 illustrates the fluid level within supply tank 32 as will be addressed hereinafter.

Figure 4:
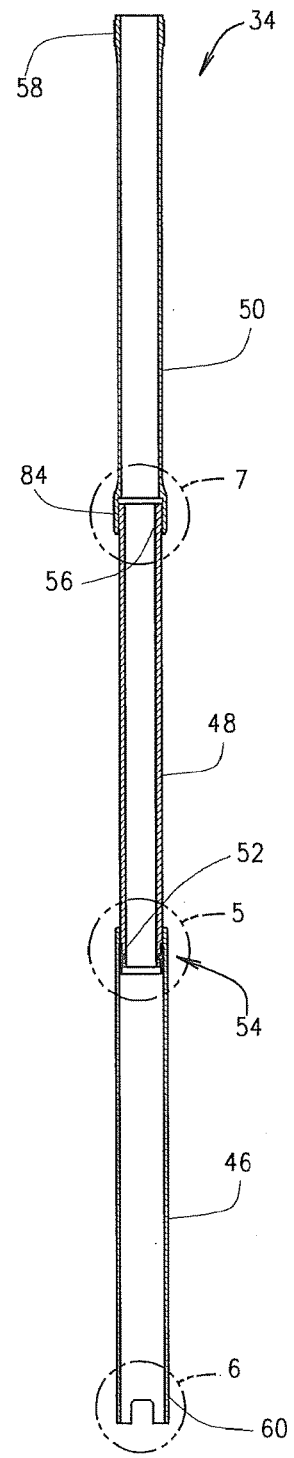
FIG. 4 is an enlarged cross-sectional view of the present adjustable suction pipe assembly constructed in accordance with the teachings of the present invention.

FIG. 4 is an enlarged cross-sectional view of the present adjustable suction pipe 34 of FIG. 3 which, in this embodiment, includes a bottom or first suction pipe member 46, a second or middle suction pipe member 48, and a third or optional extension pipe member 50. The second or middle suction pipe member 48 is frictionally coupled to the first or bottom suction pipe member 46 and includes the present seal member 54 associated with one end portion 52 of the middle pipe member 48 as will be hereinafter further explained. The middle suction pipe member 48 is slidably movable and collapsible within suction pipe member 46 and suction pipe member 48 can be adjusted within pipe member 46 such that its one end portion 52 can be located at any intermediate location between the opposite end portions of pipe member 46 as will be hereinafter further explained. The opposite end portion 56 of middle suction pipe member 48 includes cooperatively engageable means, typically threaded means, for engaging both the pump inlet 36 and, if necessary, extension suction pipe member 50 as will be hereinafter further explained. In this regard, one end portion 84 (FIG. 7) of extension pipe member 50 likewise includes complimentary cooperatively engageable means, typically threaded means, for engaging end portion 56 of middle pipe member 48. If extension pipe member 50 is utilized, its opposite end portion 58 will include cooperatively engageable means for engaging the pump inlet 36. Extension pipe member 50 is optional as will be explained.

Figure 5:
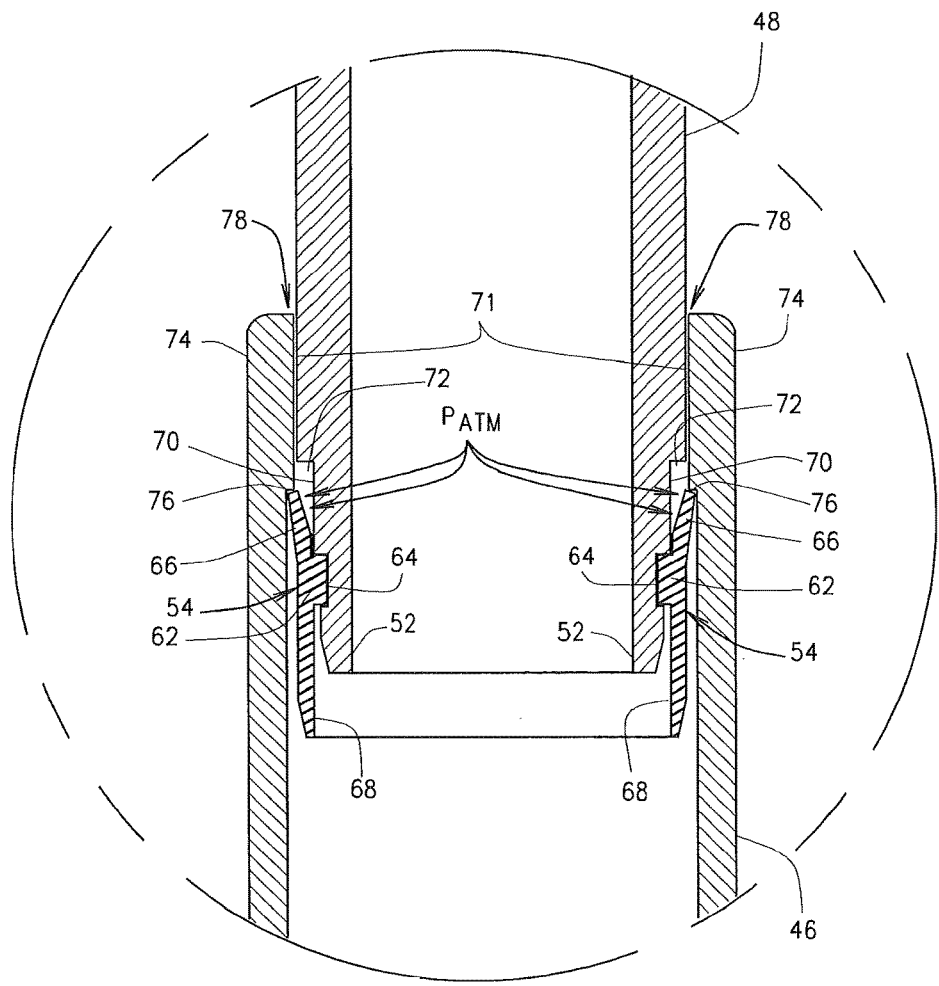
FIG. 5 is a partial enlarged cross-sectional view of the present seal illustrated in FIG. 4.
Figure 6:
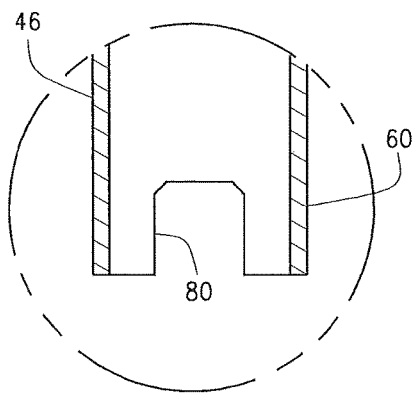
FIG. 6 is a partial enlarged cross-sectional view of the bottom end portion of the bottom pipe section of the present suction pipe assembly illustrated in FIG. 4.
Figure 7:
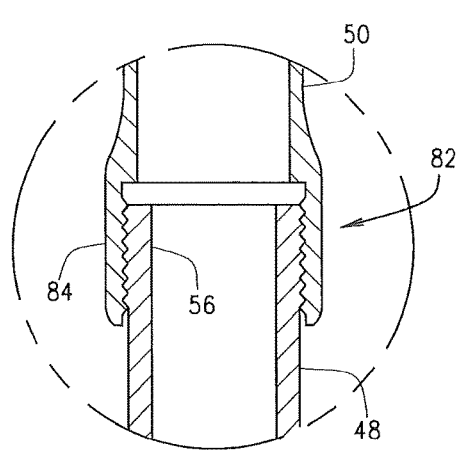
FIG. 7 is a partial cross-sectional view of the joiner mechanism associated with the extension pipe member illustrated in FIG. 4.
Figure 9:
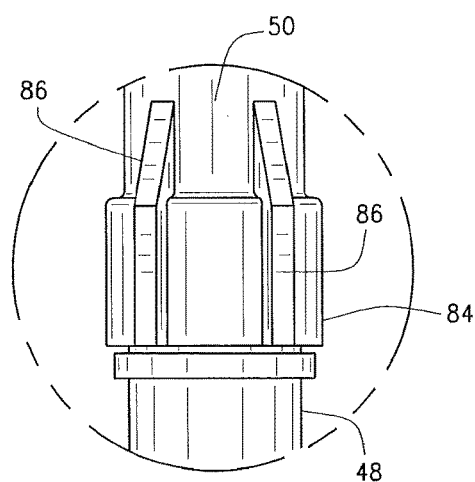
FIG. 9 is a partial side elevational view of the joiner mechanism between the extension pipe member and the middle pipe section.

FIG. 5 is an enlarged partial cross-sectional view of the area 5 illustrated in FIG. 4 showing the construction of the present suction pipe seal member 54 and its engagement with both pipe end portion 52 and bottom pipe member 46. Similarly, FIG. 6 is a partial enlarged cross-sectional view of the area 6 illustrated in FIG. 4 showing the construction of the terminal end portion 60 of the bottom pipe member 46. FIG. 7 is a partial cross-sectional view of the area 7 illustrated in FIG. 4 showing the joinder between the optional extension pipe member 50 and end portion 56 of the middle pipe member 48, and FIG. 9 is a side elevational view of the area 9 in FIG. 3 showing the outside construction of the rib members associated with end portion 84 of extension pipe member 50.

Figure 1:
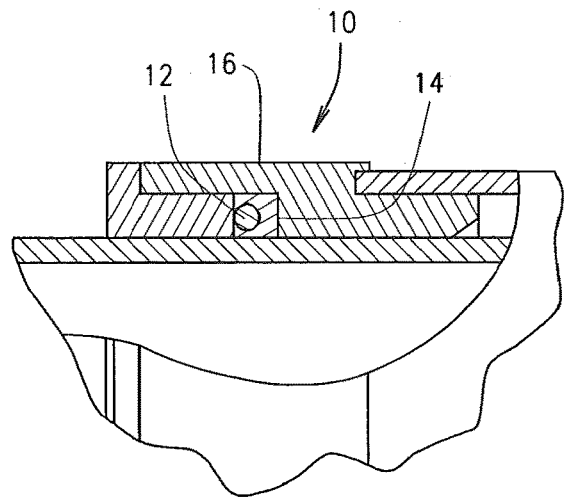
FIG. 1 is a partial cross-sectional view of a prior art seal associated with a suction pipe wherein the seal is energized with an O-ring.
Figure 2:
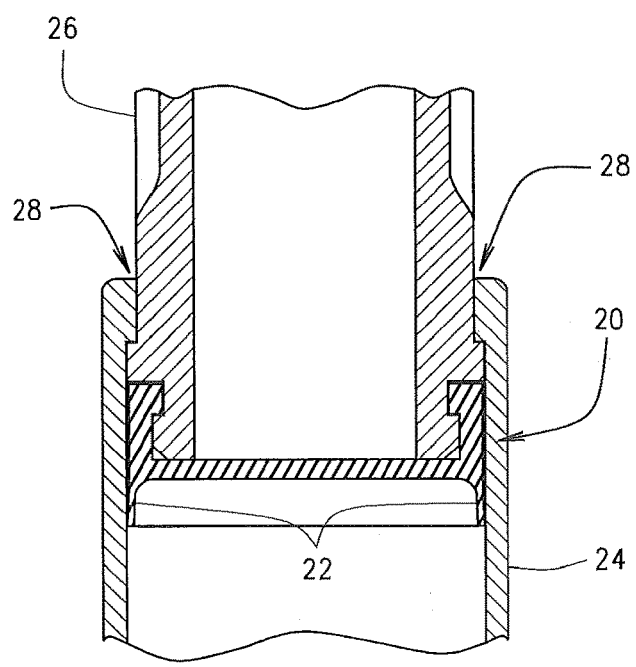
FIG. 2 is a partial cross-sectional view of another prior art seal.
Figure 8:
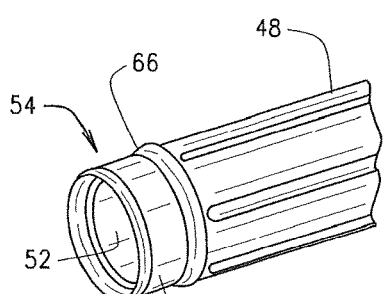
FIG. 8 is a partial perspective view of the present seal member of FIGS. 4 and 5 fitted onto one end portion of the middle pipe section constructed in accordance with the teachings of the present invention.

As best illustrated in FIGS. 5 and 8, the present seal 54 is annular in shape and is constructed so as to snap onto or otherwise mate with end portion 52 of the second or middle suction pipe member 48. As best illustrated in FIG. 5, the present seal member 54 includes an annular flange or projection portion 62. The flange portion 62 is designed to be engaged with a annular notch or channel 64 associated with end portion 52 of pipe member 48. The present seal member 54 is designed to slide onto end portion 52 of pipe member 48 and the annular flange 62 is designed to snap into the corresponding mating annular notch or channel 64 thereby holding the present seal 54 in proper operative position on end portion 52 of pipe member 48. In addition, the present seal member 54 includes annular end portion 66 which extends towards the opposite end portion 56 of pipe member 48 and annular portion 68 which extends in the opposite direction and overlays end portion 52 of pipe member 48. As best illustrated in FIG. 5, annular seal portion 66 is inverted as compared to seal portions 22 associated with the prior art seal 20 (FIG. 2) and is, in fact, angled outwardly or oriented so as to extend away from the outside diameter of end portion 52 as best illustrated in FIG. 5. Annular seal portion 66 extends in a direction towards the inside diameter of pipe member 46 and, in fact, engages the inner wall surface of pipe member 46 as illustrated in FIG. 5.

The one end portion 52 of pipe member 48 is notched or otherwise formed at 70 such that the outside diameter of end portion 52 is less than the outside diameter of that portion 71 located adjacent thereto. As a result, when pipe end portion 52 is slidably inserted within pipe member 46, a space 72 is formed between the outside diameter of pipe end portion 52 and the inside diameter of pipe member 46 and seal end portion 66 sits within space 72.

Because seal portion 66 is angularly oriented within space 72 as illustrated in FIGS. 5 and 8, when end portion 52 of middle pipe member 48 is slidably inserted into the bottom pipe member 46, the seal member 54 frictionally engages the inside diameter side wall of bottom pipe member 46 along its entire length and this frictional engagement allows end portion 52 and seal member 54 to be slidably positioned anywhere along the length of pipe member 46. It is the frictional engagement of the seal member 54 with the inner side wall of pipe member 46 which allows the middle pipe member 48 to be adjustable within pipe member 46 and to be frictionally held at any intermediate location along its length. Middle pipe member 48 can be fully collapsed within the bottom pipe member 46 or, as explained above, its end portion 52 can be positioned at any intermediate location.

In addition, end portion 74 of the bottom pipe member 46 may also include a notch or shoulder 76 which can be positioned adjacent to or in the vicinity of end portion 74 as best illustrated in FIG. 5. The notch or shoulder 76 functions as a stop member for preventing the middle pipe member 48 from being completely disengaged from the bottom pipe member 46. In this regard, as seal member 54 is being pulled towards end portion 74 of pipe member 46, the annular seal portion 66 will engage the shoulder 76 thereby impeding further movement of pipe member 48 relative to pipe member 46 in that direction.

As previously explained, if the fluid level 44 within the supply tank 32 (FIG. 3) is above seal member 54, there is no possibility for atmospheric air in the tank to enter the suction pipe since the pressure within the supply tank both above and below the seal member 54 will be the same. As a result, the seal in this configuration will have no impact on pump performance. However, as likewise previously explained, if the fluid level 44 within the supply tank 32 is below the seal member 54 as illustrated in FIG. 3, the ($P_1$) pressure within the suction pipe will be less than the atmospheric pressure ($P_{atm}$) within the supply tank 32 above the fluid level 44 when the pump 38 pulls a vacuum within the suction pipe to draw the fluid from the supply tank into the suction pipe assembly 34. In this particular operating condition, it is possible for atmospheric air to be drawn into the suction pipe 34 at the juncture or interface of pipe members 48 and 46 as indicated by the arrows 78 illustrated in FIG. 5. If this occurs, atmospheric air will flow into the annular space 72 between the pipe members 46 and 48 and will apply pressure against seal portion 66 as illustrated in FIG. 5 thereby further pushing seal portion 66 against the inner wall surface of pipe member 46 and further engaging the seal with the suction pipe. In effect, the leakage of atmospheric air into the suction pipe 34 as illustrated in FIG. 5 effectively activates the seal member 54 and prevents atmospheric air from entering pipe member 46. Stated another way, the negative pressure $P_1$ or vacuum created by the pump within pipe assembly 34 actually activates or seals the joint between pipe members 46 and 48 as indicated above thereby preventing any adverse pump performance.

FIG. 6 is an enlarged partial cross-sectional view of area 6 in FIG. 4 illustrating the bottom end portion 60 of the bottom pipe member 46 which sits or rests on the floor of the supply tank 32. The pipe end portion 60 includes at least one slot or opening 80, and preferably a plurality of openings 80, spaced around the periphery or circumference of the pipe end portion 60 for allowing the liquid or fluid within supply tank 32 to more easily enter pipe member 46.

FIG. 7 is a partial cross-sectional view of area 7 illustrated in FIG. 4 showing one embodiment of the joinder mechanism 82 associated with the respective one end portions of the middle pipe member 48 and the extension pipe member 50. The extension pipe member 50 is optional and is only used, if necessary, depending upon the overall height or depth of the supply tank 32 into which the present suction pipe assembly 34 is installed. In this regard, the opposite end portion 56 of middle pipe member 48 includes a plurality of threads which are compatible for cooperatively engaging a plurality of threads associated with end portion 84 of extension member 50. This threaded engagement provides an adequate seal between pipe members 48 and 50 and does not allow atmospheric air to be drawn into the suction pipe at this joinder. It is also recognized and anticipated that any other cooperatively engageable means, other than the threaded engagement illustrated in FIG. 7, can be utilized to join pipe members 48 and 50.

It is also recognized and anticipated that the cooperatively engageable means associated with end portion 56 of pipe member 48 should likewise be compatible with engaging the pump inlet 36 associated with pump 38 illustrated in FIG. 3. This is necessary because extension pipe member 50 is optional and may not be necessary depending upon the overall height or depth of the supply tank 32 into which the present suction pipe assembly 34 will be installed. In many cases, suction pipe members 46 and 48 will be sufficient to extend vertically throughout the entire height or depth of a particular supply tank. Since middle pipe member 48 is slidably adjustable within bottom pipe member 46, pipe member 48 can be positioned and adjusted relative to pipe member 46 such that end portion 56 will extend through the bung hole 42 associated with the particular supply tank 32 and will be positioned exterior of the supply tank for engagement with the pipe inlet 36 of pump 38. In the event that full extension of middle pipe member 48 relative to the bottom pipe member 46 is not sufficient to reach the top of a particular supply tank such as the arrangement illustrated in FIG. 3, then extension pipe member 50 is utilized. As a result, in certain situations, the present suction pipe assembly may include just suction pipe members 46 and 48 with the present seal member 54 associated with end portion 52 of pipe member 48. In other situations, extension pipe member 50 may be necessary in order to allow the present suction pipe assembly to extend exterior of the supply tank for engagement with a pump such as pump 38.

It is also recognized that any other type of cooperatively engageable means between end portion 56 of pipe member 48 and end portion 84 of extension pipe member 50, other than the threaded engagement illustrated in FIG. 7, can be utilized so long as the cooperatively engageable joinder means prevents air from being drawn into the suction pipe at that joinder.

Still further, as best illustrated in FIG. 9, end portion 84 of extension pipe member 50 may include a plurality of rib members 86 for providing additional strength and reinforcement to that end of extension pipe member 50. In this regard, the rib or flange extension members 86 can be located on the outside surface of end portion 84 as illustrated in FIG. 9 opposite the internal threads associated therewith so as to provide additional reinforcement for pipe end portion 84 and to function as a tightening and loosening means for engaging and disengaging the extension pipe member 50 with the middle pipe member 48. The rib members 86 also provide additional strength and stability to the joinder 82 and likewise improve manufacturing by allowing the use of an automatic unscrewing mechanism within the molding operation.

Although the present suction pipe assembly 34, with or without extension pipe member, is typically made of a plastic type material including seal member 54, it is recognized and anticipated that both the seal 54 as well as the individual suction pipe members 46, 48 and 50 can be made of any suitable material depending upon the particular application and depending upon the type of fluid associated with the particular supply tank into which the present adjustable suction pipe assembly will be installed. It is also recognized and anticipated that other variations and modifications to the construction of the present seal member 54 as well as the construction of the various pipe members, 46, 48 and 50 are also contemplated so long as the present seal member 54 includes an angularly oriented portion such as seal portion 66 illustrated in FIGS. 5 and 8 for further activating the present seal when atmospheric air in, the supply tank is allowed to enter the present suction pipe assembly as previously explained.

Thus, there has been shown and described one aspect of an adjustable suction pipe assembly for use in a liquid transfer system for conveying a liquid from a supply tank to a pump inlet for dispensing therefrom which fulfills the objectives and advantages sought therefore. Many changes, modifications, variations and other uses in applications of the present adjustable suction pipe with an improved pressure activated seal associated therewith will, however, become apparent to those skilled in the art after considering this specification and the accompanying drawings. All such changes, modifications, variations and other uses in applications which do not depart from the spirit and scope of the present invention are deemed to be covered by the present invention which is limited only by the claims which follow.

What is claimed is:

1. An adjustable suction pipe assembly for insertion into a supply tank comprising:
    a first pipe member having opposed end portions, a pipe opening extending therethrough, and an outside and inside diameter;
    a second pipe member having opposed end portions, a pipe opening extending therethrough, and an outside and inside diameter, the second pipe member being insertable within said first pipe member and being slidably adjustable along the length of said first pipe member;
    one end portion of said second pipe member having a seal member associated therewith, said seal member including one terminal end portion thereof which is oriented so as to extend away from the outside diameter of the one end portion of said second pipe member;
    said one end portion of said second pipe member having said seal member associated therewith being frictionally insertable within said first pipe member such that said seal member is slidably adjustable along the length of said first pipe member, the one terminal end portion of said seal member which is oriented so as to extend away from the outside diameter of the one end portion of said second pipe member sits in a space formed between the outside diameter of said second pipe member and the inside diameter of said first pipe member such that a space exists between the one terminal end portion of said seal member and the outside diameter of the second pipe member and the one terminal end portion of said seal member abuts the inside diameter of said first pipe member whereby if atmospheric air enters said first pipe member at a location above said seal member, the atmospheric air pressure will further force the one terminal end portion of said seal member against the inside diameter of said first pipe member;
    wherein the outside diameter of said one end portion of said second pipe member having said seal member associated therewith is less than the outside diameter of that portion of said second pipe member located adjacent thereto, said space being formed between the outside diameter of said one end portion of said second pipe member and the inside diameter of said first pipe member.

2. The adjustable suction pipe assembly defined in claim 1 wherein the inside diameter of said first pipe member includes a shoulder adjacent one end portion thereof, said shoulder functioning as a stop member for engaging the one terminal end portion of said seal member when said second pipe member is moved in a direction to exit said first pipe member.

3. The adjustable suction pipe assembly defined in claim 1 wherein the opposite end portion of said first pipe member includes at least one opening located transverse to the pipe opening.

4. The adjustable suction pipe assembly defined in claim 1 wherein the opposite end portion of said second pipe member is cooperatively engageable with a pump inlet associated with a pump.

5. The adjustable suction pipe assembly defined in claim 1 including a third pipe member having opposed end portions and a pipe opening extending therethrough, one end portion of said third pipe member being cooperatively engageable with the opposite end portion of said second pipe member.

6. The adjustable suction pipe assembly defined in claim 5 wherein the opposite end portion of said third pipe member is cooperatively engageable with a pump inlet associated with a pump.

7. An adjustable suction pipe assembly for insertion into a supply tank comprising:
    a first pipe member having opposed end portions, a pipe opening extending therethrough, and an outside and inside diameter;
    a second pipe member having opposed end portions, a pipe opening extending therethrough, and an outside and inside diameter, the second pipe member being insertable within said first pipe member and being slidably adjustable along the length of said first pipe member;
    one end portion of said second pipe member having a seal member associated therewith, said seal member including one terminal end portion thereof which is oriented so as to extend away from the outside diameter of the one end portion of said second pipe member;
    said one end portion of said second pipe member having said seal member associated therewith being frictionally insertable within said first pipe member such that said seal member is slidably adjustable along the length of said first pipe member, the one terminal end portion of said seal member which is oriented so as to extend away from the outside diameter of the one end portion of said second pipe member sits in a space formed between the outside diameter of said second pipe member and the inside diameter of said first pipe member such that a space exists between the one terminal end portion of said seal member and the outside diameter of the second pipe member and the one terminal end portion of said seal member abuts the inside diameter of said first pipe member whereby if atmospheric air enters said first pipe member at a location above said seal member, the atmospheric air pressure will further force the one terminal end portion of said seal member against the inside diameter of said first pipe member;

wherein said seal member includes a flange portion and the one end portion of said second pipe member includes a notch, the flange portion of said seal member being receivable within said notch.

8. An adjustable suction pipe assembly for insertion into a supply tank comprising:

a first pipe member having opposed end portions, a pipe opening extending therethrough, and an outside and inside diameter;

a second pipe member having opposed end portions, a pipe opening extending therethrough, and an outside and inside diameter, the second pipe member being insertable within said first pipe member and being slidably adjustable along the length of said first pipe member;

one end portion of said second pipe member having a seal member associated therewith, said seal member including one terminal end portion thereof which is oriented so as to extend away from the outside diameter of the one end portion of said second pipe member;

said one end portion of said second pipe member having said seal member associated therewith being frictionally insertable within said first pipe member such that said seal member is slidably adjustable along the length of said first pipe member, the one terminal end portion of said seal member which is oriented so as to extend away from the outside diameter of the one end portion of said second pipe member sits in a space formed between the outside diameter of said second pipe member and the inside diameter of said first pipe member such that a space exists between the one terminal end portion of said seal member and the outside diameter of the second pipe member and the one terminal end portion of said seal member abuts the inside diameter of said first pipe member whereby if atmospheric air enters said first pipe member at a location above said seal member, the atmospheric air pressure will further force the one terminal end portion of said seal member against the inside diameter of said first pipe member;

a third pipe member having opposed end portions and a pipe opening extending therethrough, one end portion of said third pipe member being cooperatively engageable with the opposite end portion of said second pipe member;

wherein the one end portion of said third pipe member which is cooperatively engageable with the opposite end portion of said second pipe member includes at least one rib member located on the outside diameter of said third pipe member adjacent that one end portion, said at least one rib member extending along a predetermined length in a direction parallel to the longitudinal axis of the third pipe member.

* * * * *